July 15, 1969   C. H. BRUMLEY ET AL   3,455,625
OPTICAL FIBER BUNDLE COUPLING SYSTEM
Filed June 23, 1966

CORWIN H. BRUMLEY
JOHN T. FERRIS
INVENTORS

BY Lowell J. Wise
ATTORNEY

United States Patent Office 3,455,625
Patented July 15, 1969

3,455,625
OPTICAL FIBER BUNDLE COUPLING SYSTEM
Corwin H. Brumley, Penfield, and John T. Ferris, Pittsford, N.Y., assignors to Bausch & Lomb Incorporated, Rochester, N.Y., a corporation of New York
Filed June 23, 1966, Ser. No. 559,918
Int. Cl. G02b 5/16
U.S. Cl. 350—96         6 Claims

ABSTRACT OF THE DISCLOSURE

Disclosed is an optical coupling apparatus for coupling a plurality of bundles of optical fibers to achieve a single light transmitting bundle without significant attenuation of the light. The device is further characterized in that the coupling material conforms to the shape of the end of each fiber bundle so that individual fibers in the bundles are contacted to provide a continuous optical path from input fibers to output fibers.

---

This invention relates to optical fiber bundles for transmitting light and provides apparatus for coupling multiple bundles to permit the continuation of light waves from one or more input bundles through a light conducting coupling material and into one or more output bundles. A particular feature of the invention is the use of transparent or translucent intermediate coupling material which conforms to the shape of the end of the fiber bundle whereby the optical coupling material contacts individual fibers in the bundles to provide a continuous optical path from input fibers to output fibers. By selecting fiber material and coupling material to have nearly the same refractive index, highly-efficient transmission of light waves is achieved.

The guiding of radiant energy along a transparent fiber by multiple internal reflections has been known for many years. One of the more important uses of this phenomenon is in the transport of light from one point to another. These fibers, in the shape of long cylinders or having other cross-sectional shapes are produced from glass, plastics or other materials which have the proper optical qualities and can be shaped or drawn to fine diameters. Ordinarily, numerous individual fibers of the order of about 25 microns up to 1 millimeter diameter are closely aligned in parallel in a bundle, usually covered with a resilient sheath such as rubber or plastic. Using fiber material having high light transmission properties, very long conductors or "light wires" may be constructed.

The internal reflection phenomenon is dependent upon a reflective coating on the fiber, or more usually upon a difference in refractive index between the fiber and its outer surface. If the fibers are small and compacted in a bundle, there is leakage between individual fibers in the bundle. To prevent this leakage between fibers a thin layer of transparent material having lesser refractive index than the core is provided. This cladding serves as a protection for the highly reflective surface of the core material. Without it, scratches, fingerprints, dust or other foreign substances diffuse the light out of the fiber to be lost in the surrounding media or to leak into adjacent fibers.

Bundles of optical fibers can be made flexible and such elements are valuable for use in fiber scopes and probes often containing many thousands of fibers. If all the individual fibers in the bundle are aligned the same at each end, an image may be transmitted by the flexible bundle. Ordinarily the ends of the bundles are ground and polished to a flat or optical shape at the terminal points of the individual fibers to avoid reflection and diffusion of the light back into the fiber and control the emerging light. The optical axis for such bundles is usually flexible which distinguishes it from other optical systems dependent upon straight line geometry. This valuable property makes the optical fiber bundles useful for supplying illumination in otherwise inaccessible locations such as intracardiac cavities, tanks or explosive environments.

While present interest in radiation conductors is directed primarily to visible light, other portions of the electromagnetic spectrum are of interest. Quartz fibers may be used for transmitting waves as low as 2000 A., and arsenic trisulfide glass extends the spectral range into the infrared rays.

Continuous manufacturing processes have made available extremely long optical fiber bundles. Also a flexible sheath of metal or plastic material may be added to the bundle by continuous methods to provide fiber bundles of indeterminate length. Most fiber optic devices employ a single long bundle for transmitting images or illuminating a remote point, and the bundle must be provided in the exact length of the optical system design.

It has been discovered that two or more optical fiber bundles may be coupled to extend the length of a light conductor or to provide a suitable means for splitting or mixing light sources. By embedding the individual fibers of a bundle in a fluent optical material which conforms to the shape of the fiber ends and sealing the optical material in place a multi-bundle optical system may be constructed. One of the advantages of such an optical junction is that its use avoids the absolute need for grinding and polishing the bundle end in a plane transverse to the optical axis. This feature derives from the continuity of the optical path for light emerging from the fiber ends. If the coupling optical material has a refractive index approximating that of the fiber material, the reflection or refraction of light at the fiber end will be greatly reduced. By using a fluent material which conforms to the bundle shape, the continuity of high-index optical material is assured. Grinding and polishing still give superior performance when using the fluent coupling. However improvement of coupling is more noticeable with unpolished fibers.

Accordingly, it is an object of this invention to provide an optical coupling system comprising two or more optical fiber bundles containing multiple optical fibers, and a light-conducting coupling material conforming to the shape of the individual fibers in the bundles to produce a continuous optical path from one bundle to another. It is a further object to provide an optical coupling material that is fluent or semi-fluent and has a refractive index approximating that of the optical fibers. These and other objects and features of the invention will be seen from the following description and in the drawing in which:

Figure 1:
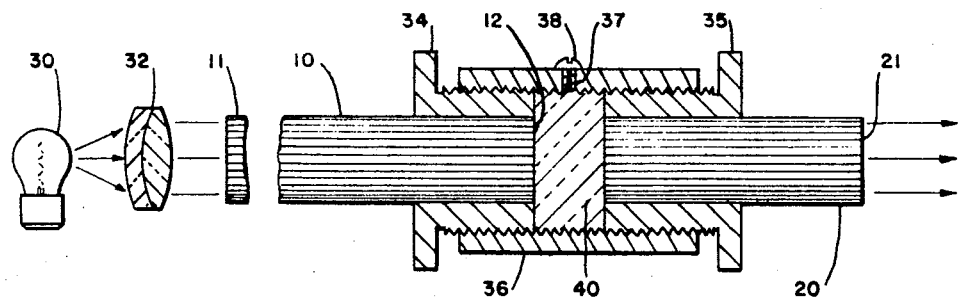
FIG. 1 is a vertical cross-sectional view of one embodiment of the invention showing two optical bundles joined by a coupling material.

In FIG. 1 light is transmitted from a first bundle 10 containing a plurality of transparent parallel fibers to a second bundle 20. A source of light such as lamp 30 is directed onto a finished face 11 in which the individual fibers are exposed. A collimating lens 32 may be used for this purpose. Bundle 10 may be a flexible element of indeterminate length which ends in a face 12 and which does not require the usual optical finishing. Face 12 may be formed merely by transverse cutting of the fiber bundle.

The length of the optical fiber bundle element may be extended by a second bundle 20 of given dimensions and having a finished face portion 21 at the end. Bundles 10 and 20 are tubular and can be secured at their terminal portions by connector members 34 and 35 which are threaded cylindrically-shaped mounting elements. A threaded mounting sleeve 36 is adapted for receiving the connector members and these elements cooperate to support the bundles in spaced relation. A vent hole 37 permits gas to escape from a cavity formed in the sleeve 36 during assembly of the optical system, and this port may be sealed by screw 38. Also, the coupling material 40 may be injected into the cavity or chamber through the hole 37.

Numerous optical materials may be used for coupling fiber bundles within the inventive concept. Several desirable properties should be kept in mind in selecting the proper coupling material for the system. Optical properties include transparency or translucency combined with a refractive index greater than unity and near that of the optical fiber. Most optical fibers have an index of refraction in the range of about 1.4 to 1.7, this range including most optical glasses and organic resins. Existing optical systems having coupled fibers must have very smooth mating faces to avoid high light losses due to reflection and refraction at the interface between the bundles. If air ($n_D = 1.0$) is used as the coupling medium an expensive finishing operation for the faces joined must be introduced into the manufacturing process. By this invention the differences between the refractive index of the fibers and the coupling medium are minimized. If different fiber materials are used in the bundles to be joined, an intermediate refractive index coupling material may be chosen.

Fluent materials having high viscosity are preferred as coupling agents. For instance, while such clear fluids as water may have suitable optical properties, the low viscosity and high capillarity of these fluids make them less desirable. The use of easily-sealed oils such as the aryl-thioethers, especially 2,3'-bis (phenylthio) diphenyl sulfide is recommended for coupling high-index glasses. Both flint glass and the recited thioether have refractive indexes of about 1.7. Various immersion liquids used in microscopes may also be employed in the present systems. These include cedarwood oil ($n_D = 1.5$) and methylene iodide ($n_D = 1.74$).

The silicone polymers are very good coupling materials. Low chemical reactivity, ease of handling, low vapor pressure, and high refractive index and light transmittance are all desirable properties for use in this invention. The more fluent of the silicone materials are grease-like, clear, colorless and stable. For example, Dow Corning C-2-0057 silicone compounds ($n_D = 1.4+$) is suitable for injection into the cavity shown in FIG. 1 through port 37. By screwing the threaded members inward the silicone grease is forced into optical contact with the faces of the fibers in bundles 10 and 20. Because it is not sufficiently fluent to have ordinary liquid flow properties, sealing of the coupling system is not necessary.

Silicone elastomers such as "Sylgard" 182 resin and "Silastic" LTV-602 are very useful because of their excellent optical properties, deformability under pressure, moldability and ease of handling. These are liquid monomers which can be molded into a desired shape and polymerized at low temperatures (about 65 to 80° C.). Polymerization of the silicones may be effected in contact with the fiber bundles by addition of a small amount of catalyst and heating the optical assembly to polymerization temperatures. Alternatively, a flexible, rubber-like disc of the silicone elastomer may be molded or cut to the shape of the fiber bundle and inserted into the sleeve between connector members 34 and 35. Application of pressure on the elastomer by screwing the threaded members forces the deformable material into optical contact with the rough contour of the unfinished bundle face. A distinct advantage in favor of the use of semifluent silicone elastomers is their versatility and elastic recovery property, which permits their reuse.

A third class of suitable optical coupling material includes the hardenable liquids, such as thermosetting resins and cements. Various clear acetate cements, epoxy molding compounds, and allyl resins are suitable. However, in the last material some allowance must be made for shrinkage of the resin during polymerization. A typical monomer used in optical systems is allyl diethyleneglycol carbonate. This class of coupling agents is injected into the coupling cavity as a liquid and hardened in place while in optical contact with the fiber faces.

Figure 2:
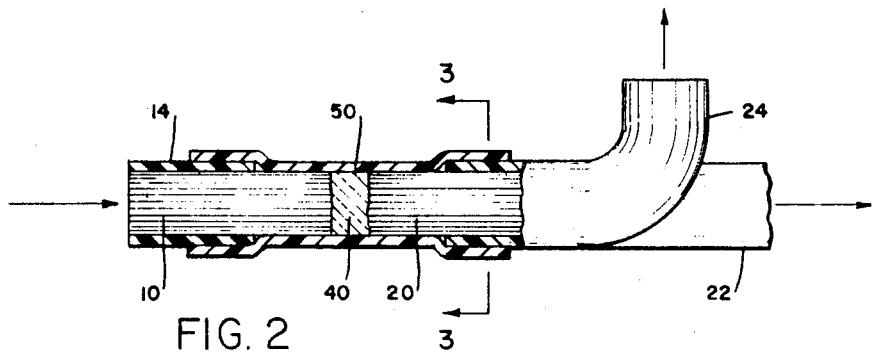
FIGS. 2 and 3 show an optical system in cross-section for splitting a sight source into two parts.
Figure 3:
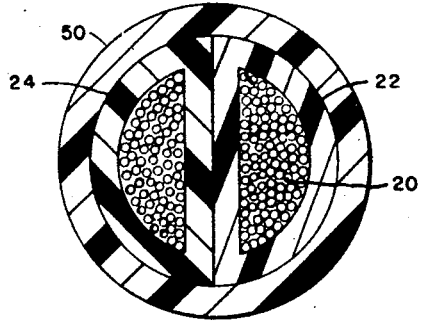

The embodiment of FIGS. 2 and 3 may be used for constructing an optical junction in which light conducted along a single bundle of optical fibers is split into two or more paths. The input bundle 10 is sheathed in a plastic material 14 which may be stripped away from the end of the fibers or can extend to a flush position where the length of fiber bundle is cut. The output from the optical junction comprises two separate sheathed bundles 22 and 24 which converge to form a single face from fibers 20. The total cross sectional areas of input and output bundles are essentially equal. A convenient method for making this junction is to place a larger tube 50 over input bundle 10. The coupling material 40 is placed between the bundle faces, and outer tube 50 is compacted around the junction. Tube 50 may be a thermoplastic material which is hot-crimped to form a seal, or it may be a heat-shrinkable resin such as Saran, Mylar or polyvinylchloride which has been previously deformed under heat to stretch the resin. These latter materials can be heated and resume a smaller diameter, as shown in U.S. Patent No. 3,198,059. Also, a metal ferrule may be crimped onto the junction to provide spacing and mounting means.

The use of optical coupling materials in the construction of fiber bundle junctions for mixing and splitting light conductors can be utilized for distributing or collecting light sources. A typical useful application of fiber optics light conductors would be for conversion of data punch card information to readable code displays, such as binary or octanary numbers. Such a code translating device is disclosed by Greanias in U.S. Patent No. 2,881,976 of Apr. 14, 1959. Another use for coupled optical fiber systems is in monitoring several light sources from a single readout point. The device shown in FIGS. 2 and 3 can be used for mixing light from branches 22 and 24 for concurrent transmission through bundle 10, used as the output from the junction.

Figure 4:
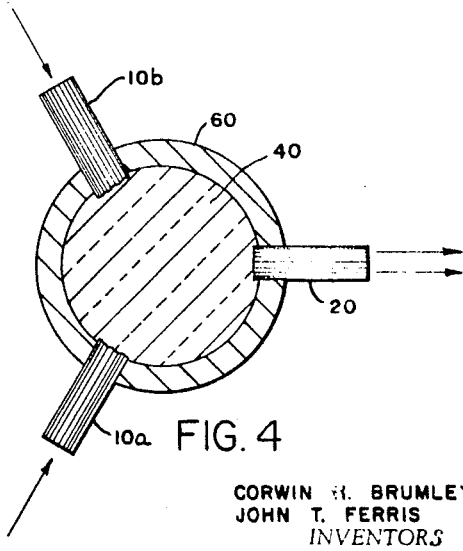
FIG. 4 is a cross-sectional view of a system for mixing two light sources into a single output bundle. Like numerals in the figures refer to like parts throughout.

A novel use of the coupling system for optical fibers employs internal reflections in the optical junction as shown in FIGURE 4. Light of a first spectral range, for instance a monochromatic light, is directed to the optical junction through fiber bundle 10a, and light of a different spectral range is introduced from bundle 10b. The coupling material 40 is contained in a reflective mounting 60, such as polished metal. It is known that light emerging from a single fiber assumes a conical shape. Therefore the many diffusing cones of light emerging from numerous individual fibers in the optical bundle are scattered throughout the coupling material. If the interior reflecting surface of chamber 60 is a spherical or cylindrical shape the light rays emerging from bundles 10a and 10b are reflected or diffused onto the face of output bundle 20 where the polychromatic light is blended or combined from the spectral ranges present in the individual input bundles. In this way a monitoring device can detect conditions of several points by observing chromatic changes in the output bundle 20. An interesting use of such a system is described by Peter et al. in U.S. Patent No. 2,589,569 in which a traffic signal has three inputs of red, green and yellow lights into a single output element. By using an integrating junction as shown in FIG. 4, this same function could be carried by only red and green monochromatic light sources. The net effect of observing a blended polychromatic light from these colors is yellow to the normal viewer even though the pure yellow spectrum is not present. The integrating sphere or cylinder shown in FIG. 4 could also be used to divide a single light source; however, the high losses due to internal reflections render this use impractical.

The invention has been described with particular reference to certain embodiments and examples shown in the drawing and in the specification. It is contemplated that changes and modifications may be made in the invention without departing from the spirit or scope thereof.

What is claimed is:

1. An optical coupling system comprising in combination multiple optical fiber bundles containing a plurality of transparent individual parallel fibers for internally reflecting light along individual optical axes, said optical fiber bundles ending in optically transmitting terminal portions;
   means for mounting the bundles to provide a spaced relation between the terminal portions; and
   means for contacting the transparent fibers of each bundle with a light-conducting coupling material at the terminal portions of the bundles, the coupling material consisting of an elastomeric silicone under positive pressure between the fiber bundles thereby conforming to the shape of the individual fibers at the terminal portions of the bundles and providing a continuous optical path from one bundle to another.

2. The optical coupling system of claim 1 including plural light input bundles directing rays from light sources having different spectral ranges, and including light output means.

3. The optical system of claim 1 wherein cross-sectional light input area is substantially equal to light output area.

4. The optical system of claim 1 comprising a mounting sleeve for receiving connector members attached to the optical fiber bundles, and having a chamber for containing the coupling material under pressure.

5. The optical coupling system of claim 4 wherein the mounting sleeve and connector members are mating threaded cylinders.

6. The optical coupling system of claim 4 wherein input and output bundles have parallel aligned optical axes.

References Cited

UNITED STATES PATENTS

| 3,289,101 | 11/1966 | Masters et al. | |
| 3,331,956 | 7/1967 | Hough et al. | |
| 3,389,950 | 6/1968 | Harper | 350—96 |

FOREIGN PATENTS 1,017,354   1/1966   Great Britain.

JOHN K. CORBIN, Primary Examiner

U.S. Cl. X.R.

350—169